US00RE35219E

United States Patent [19]

Kent

[11] E Patent Number: Re. 35,219

[45] Reissued Date of Patent: Apr. 30, 1996

[54] APPARATUS FOR USING HAZARDOUS WASTE TO FORM NON-HAZARDOUS AGGREGATE

[75] Inventor: John M. Kent, Slidell, La.

[73] Assignee: Marine Shale Processors, Inc., Baton Rouge, La.

[21] Appl. No.: 6,604

[22] Filed: Jan. 21, 1993

Related U.S. Patent Documents

Reissue of:

[64] Patent No.: 4,986,197
Issued: Jan. 22, 1991
Appl. No.: 520,558
Filed: May 8, 1990

U.S. Applications:

[63] Continuation-in-part of Ser. No. 362,352, Jun. 6, 1989, Pat. No. 4,922,841, which is a continuation of Ser. No. 244,017, Sep. 14, 1988, abandoned.

[51] Int. Cl.[6] ..... A47J 36/00; A47J 36/24

[52] U.S. Cl. ..... 110/246; 110/219; 110/235

[58] Field of Search ..... 110/211, 212, 110/214, 219, 235, 346, 238, 246, 165 A

[56] References Cited

U.S. PATENT DOCUMENTS

| | | | |
|---|---|---|---|
| 2,917,011 | 12/1959 | Korner | 110/165 A |
| 3,592,151 | 7/1971 | Webber . | |
| 3,618,537 | 11/1971 | Bogue et al. . | |
| 3,697,256 | 10/1972 | Engle . | |
| 3,766,866 | 10/1973 | Krumm . | |
| 3,848,871 | 11/1974 | Bolejack, Jr. et al. . | |
| 3,938,449 | 2/1976 | Frisz et al. . | |
| 4,063,903 | 12/1977 | Beningson et al. . | |

(List continued on next page.)

FOREIGN PATENT DOCUMENTS

| | | |
|---|---|---|
| 3022126 | 1/1981 | Germany . |
| 587811 | 5/1947 | United Kingdom . |

OTHER PUBLICATIONS

Hazardous Materials and Waste Management, Nov.–Dec., 1987, W. R. Duggett, pp. 15–17, "Slagging Kiln 'Fired Up' to Meet PCB Disposal Needs".

Literature brochure from Von Roll Inc., pp. 1–21.

Brochure from Phillips Petroleum Company, May 1987 and Phillips Petroleum News Release, Jun. 4, 1987.

C–E Raymond literature brochure, pp. 1–9, 11–12.

Ford, Bacon and Davis, Therman Waste Destruction Systems.

C–E Raymond Rotary Incinerator Systems brochure, Solutions for Hazardous and Toxic Waste Disposal, 1987, pp. 1–8.

Experience in Slagging Pyrolysis Systems, A. Eggen and O. A. Powell Jr., orginally presented before the Incinerator Division Research Committee, Oct. 28, 1971, pp. 257–269.

The Hazardous Waste Consultant, "Soil Vitrification In A Slagging Cyclone Furnace," Jan./Feb. 1992, pp. 1.13–1.16.

Norman F. Sather, "Hazardous Waste: Where to Put it? Where Will it Go?", Mechanical Engineering, Sep. 1988, pp. 70–75.

*Primary Examiner*—Weilun Lo

*Attorney, Agent, or Firm*—Finnegan, Henderson, Farabow, Garrett & Dunner

[57] ABSTRACT

Hazardous waste is formed into non-hazardous non-leaching aggregate by introducing the material to a rotary kiln where the large solids are at least partially combusted to form a primary aggregate. Gaseous combustion by-products and waste fines from the waste materials are introduced into at least one oxidizer having water-cooled metal walls. Some of the waste fines are melted to form a molten slag-like material that is removed from the apparatus and cooled to form non-hazardous aggregate. The portion of the material in the oxidizer that is not melted, is cooled, neutralized and subjected to a solid gas separation. The solid is reintroduced to the oxidizer with the primary aggregate where they are either melted or entrained within the molten material and become an integral part of the non-hazardous aggregate.

40 Claims, 5 Drawing Sheets

U.S. PATENT DOCUMENTS

| | | | |
|---|---|---|---|
| 4,193,354 | 3/1980 | Woods . | |
| 4,270,470 | 6/1981 | Barnett et al. . | |
| 4,290,797 | 9/1981 | Rossi . | |
| 4,308,809 | 1/1982 | Woods . | |
| 4,331,088 | 5/1982 | Gold . | |
| 4,361,100 | 11/1982 | Hinger . | |
| 4,398,475 | 8/1983 | McKiel, Jr. . | |
| 4,437,419 | 3/1984 | Hertel . | |
| 4,546,711 | 10/1985 | Kerwin . | |
| 4,574,714 | 3/1986 | Bach et al. . | |
| 4,598,650 | 7/1986 | Schneckenberger . | |
| 4,602,574 | 7/1986 | Bach et al. . | |
| 4,658,736 | 4/1987 | Walter . | |
| 4,667,608 | 5/1987 | Chang . | |
| 4,682,548 | 7/1987 | Peng . | |
| 4,695,447 | 9/1987 | Shultz . | |
| 4,784,604 | 11/1988 | O'Connor | 110/246 X |
| 4,787,320 | 11/1988 | Raaness et al. . | |
| 4,794,871 | 1/1989 | Schmidt et al. . | |
| 4,840,130 | 6/1989 | Quiel . | |
| 4,862,813 | 9/1989 | Levin et al. | 110/246 X |
| 4,889,058 | 12/1989 | Yang et al. | 110/246 X |
| 4,922,841 | 5/1990 | Kent . | |
| 5,027,722 | 7/1991 | Schwyter . | |
| 5,044,286 | 9/1991 | Breen et al. | 110/165 A |
| 5,052,312 | 10/1991 | Rackley et al. . | |
| 5,078,065 | 1/1992 | Tsunemi et al. | 110/165 A X |
| 5,133,267 | 7/1992 | Kent et al. . | |

APPARATUS FOR USING HAZARDOUS WASTE TO FORM NON-HAZARDOUS AGGREGATE

Matter enclosed in heavy brackets [ ] appears in the original patent but forms no part of this reissue specification; matter printed in italics indicates the additions made by reissue.

CROSS REFERENCE TO RELATED APPLICATIONS

The present application is a continuation-in-part of U.S. patent application Ser. No. 362,352 filed Jun. 6, 1989, now U.S. Pat. No. 4,922,841 which is a continuation of U.S. patent application Ser. No. 244,017 filed Sep. 14, 1988, now abandoned.

BACKGROUND OF THE INVENTION

The present invention relates to an apparatus for using hazardous waste to form non-hazardous aggregate by thermally induced oxidation.

Many industrial processes produce by-products and waste materials that cannot be legally disposed of without some type of containment or treatment. Efforts in the past to dispose of such materials within containment vessels have proved inadequate since lack of attention to the manufacture of such containment vessels or their deterioration results in leakage or spillage of the hazardous waste. Other means of treating hazardous waste include the injection of such materials into wells, however, such materials may not be immobile within the strata into which they are injected and may find their way into underground aquifers.

In addition to the technical problems associated with such disposal techniques, there remains potential liability for anyone using such facilities. Years after the materials are deposited at the disposal site, claims for liability can be generated based on the knowledge that a party has been responsible for placing hazardous material within an approved waste disposal site only to have the disposal site be unsuccessful in preventing dispersion of the waste. Such problems have generated a search for means of using hazardous waste in a manufacturing process to eliminate its hazardous nature to produce a product suitable for sale to and use by the general public. One of the means attempted has been to oxidize the material by passing it through various types of heaters under oxidizing conditions. One such variation of such a process uses a counter current rotary kiln to induce combustion of the combustible components in the hazardous waste and to aggregate the noncombustible material into a form that could be sold as a commercially valuable and useful product.

Efforts in this particular method of waste use have been partially successful in manufacturing a product that will pass the applicable EPA regulations associated with the disposal of waste. These processes, however, have significant shortcomings. The most significant shortcoming associated with the use of hazardous waste in a rotary kiln or the like is the generation of additional noncombustible material that is not formed into an aggregate and must be disposed of as hazardous waste. Thus, although the amount of the hazardous waste has been significantly reduced by the process, there still remains the problem of disposal of a portion of the treated material as hazardous waste material. In addition, most conventional processes generate large quantities of contaminated scrubber water that must be treated and disposed of.

Therefore, it is one object of the present invention to provide an apparatus for using hazardous waste material as a recyclable material in a manufacturing process such that the only products of such an apparatus are non-hazardous and may be sold for use by the general public without concern as to the nature of the input materials that were processed.

It is another object of the invention to convert hazardous solid materials to a non-hazardous, inert aggregate that may be sold without restriction.

It is another object of the invention to make use of hazardous waste liquids as fuels and fuel supplements in lieu of natural gas or coal in an economical fashion where any solids resulting from the use may be sold to the general public without concern as to the hazardous nature of the input materials.

It is an additional object of the invention to provide a system for the use of hazardous waste materials on a large scale that can be operated economically without significant risk to personnel operating the system.

It is a further object of the invention to provide an apparatus that is not subject to frequent interruptions in its operation for required periodic maintenance or repair.

An additional object of the invention is to reduce the amount of water injected into the apparatus and thus increase the amount of material that can be processed.

These and other objects of the invention will be more fully disclosed in the present specification or may be apparent from practice of the invention.

SUMMARY OF THE INVENTION

To achieve these and other objects of the invention, there is provided an apparatus for converting hazardous waste into a non-hazardous aggregate includes a rotary kiln having an entry portion. Oxidizing means are in flow communication with the entry portion of the kiln. The oxidizing means are comprised of at least one water-cooled, metal-walled vessel. There is also provided a source of solid waste material with the solid waste material comprising large solid waste and water fines. Means for separating the large solid waste form the waste fines are included as are means for introducing the large solid waste to the entry portion of the rotary kiln. The device further includes means for inducing combustion in the kiln to convert the large solid waste to solid particulate primary aggregate, clinker, volatile gases and gaseous combustion by-products. Means are included for inducing combustion in the oxidizing means to convert the waste fines, the volatile gases and the gaseous combustion by-products into noncombustible fines, molten slag and waste gas. The device further includes means for introducing the solid particulate primary aggregate and reintroducing the solid noncombustible fines to the molten slag to form a substantially molten mixture. The device includes means for removing the mixture from the apparatus.

Preferably, the oxidizing means comprise a plurality of vessels in flow communication with the entry portion of the rotary kiln.

The present invention will now be disclosed in terms of preferred embodiments.

BRIEF DESCRIPTION OF THE DRAWINGS

The drawings, which form a portion of the specification, depict an embodiment of the invention.

DESCRIPTION OF THE PREFERRED EMBODIMENT

Figure 1:
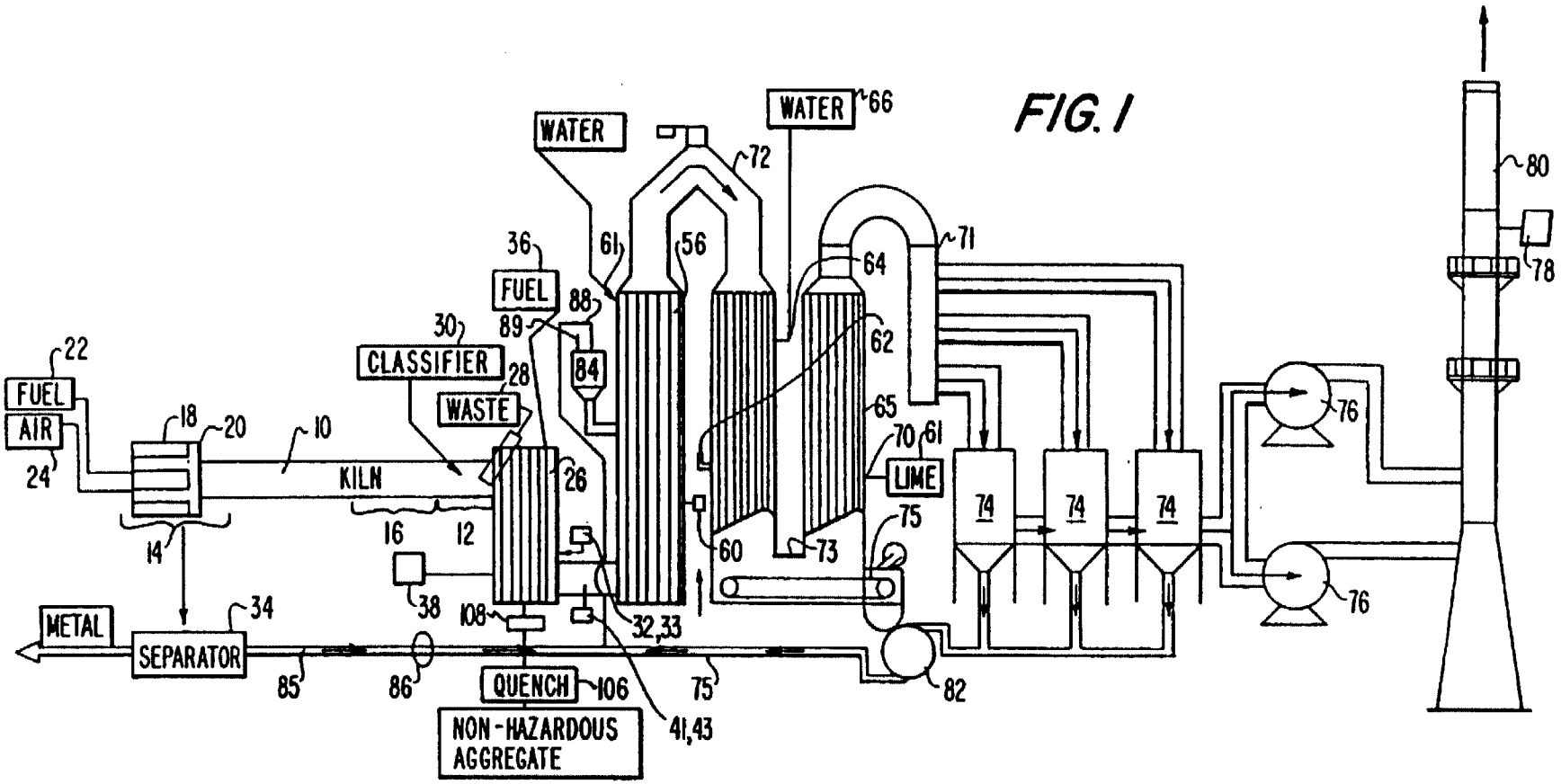
FIG. 1 is a schematic representation of one embodiment of the present invention.

The embodiment of the present invention is schematically depicted in FIG. 1.

The present invention is an apparatus for converting hazardous waste into non-hazardous aggregate and a process of operating apparatus for carrying out that function. In accordance with the invention, there is provided a rotary kiln having an entry portion and an exit portion. As here embodied and depicted in FIG. 1, the rotary kiln 10 includes an entry portion 12 and an exit portion 14. Located between the entry and exit portions of the rotary kiln, is the combustion portion 16. While in the embodiment depicted, the boundaries of the various portions are co-terminal, the three portions of the rotary kiln are merely illustrative and can overlap. That is to say some combustion may take place in the entry portion 12 or the exit portion 14, however, combustion takes place primarily in the combustion portion 16 of the rotary kiln 10.

The kiln depicted schematically in FIG. 1 is a standard counter current rotary kiln constructed for the treatment of limestone or oyster shell to form lime. It is comprised of an external metal shell that is lined with refractory brick. The composition of the refractory brick is determined by the operating temperatures and the materials passed through the rotary kiln. In the present embodiment where the rotary kiln is designed to operate at a temperature in the range of from 1600° F. to 2300° F., a refractory brick consisting of 70% alumina a product of the National Refractory Company of Oakland, Calif. has been used without premature refractory deterioration. The rotary kiln is supported on conventional bearing supports (not shown) and driven at rotational speeds in the range of 1 to 75 RPH by conventional kiln drive means (not shown).

As will be discussed in more detail hereinafter, solids are introduced to the entry portion 12 of the rotary kiln 10. As it rotates, the material larger than about 50 microns travels through the combustion zone 16 toward the exit portion 14 while the smaller material is entrained in the gas flowing counter current to the larger solid material. In the embodiment depicted, the rotary kiln 10 includes cooling chambers 18 on the exit portion of the kiln. The cooling chambers receive the solid material through ports communicating into the rotary kiln. The chambers receive the larger solid material which is transmitted by rotation to an exit chute 20 where the solid material issuing from the rotary kiln exits therefrom. Also associated with the rotary kiln 10 is a source of fuel 22 as well as a source of air 24 to support combustion within the rotary kiln 10. The fuel that can be used can be combustible liquid or gas, including combustible waste liquids, combustible liquid fuel or combustible natural gas. Oxygen, or water in combination are used to control temperatures and combustion. The air fuel mixture is introduced to the rotary kiln 10 at the exit portion 14 with gases in the kiln 10 passing toward the entry portion 12 counter-current to the larger solids being transported by rotation of the kiln toward the exit portion 14. As noted previously, the smaller particles are entrained in the gases passing through the kiln and are thus separated from the larger solids and transported from the kiln.

In accordance with the invention, the apparatus includes oxidizing means adjacent the entry portion of the kiln. As here embodied, the apparatus includes a first oxidizer 26. As shown in FIG. 1, the first oxidizer 26 is adjacent to the entry portion 12 of the rotary kiln. The oxidizer 26 is in flow communication with the entry portion 12 of the rotary kiln 10 and receives volatile gas driven off the material introduced to the rotary kiln as well as the combustion by-products from the combustion taking place in the rotary kiln. A source of waste material introduces material to the entry portion 12 of the kiln 10, where the counter-current gas flow effects a separation of the larger particles (solid waste material) and the smaller particles (waste fines). In accordance with the invention, the solid waste material is comprised of large solid waste and waste fines. For purposes of the present invention, large solid waste is waste having a particle size greater than about 50 microns whereas waste fines are defined as any material having a particle size less than 50 microns. While the apparatus is operable with materials separated to a different size, it is the purpose of the separation to provide material to the first oxidizer 26 than can be readily oxidized or melted in its physical state with the larger material being introduced to the kiln to be broken down during its transit through the rotary kiln to either incombustible material, volatile gas or combustion by-products.

In accordance with the invention, there are provided means for separating the large solid waste from the waste fines. As here embodied and depicted in FIG. 1, the apparatus includes a classifying conveyor 30 which receives material form the waste source 28 and introduces the waste derived fuel into the entry portion 12 of the rotary kiln 10. Classifying of the large solid waste from the waste fines occurs throughout the rotary kiln 10. It should also be noted that the solid waste could also be separated by size prior to introduction into the kiln and the waste fines can then be directly introduced into the oxidizing means.

In accordance with the invention, the apparatus includes means for inducing combustion in the kiln to convert the large solid waste to solid particulate primary aggregate, clinker, volatile gases and gaseous combustion by-products. As here embodied and depicted in FIG. 1, the combustion inducing means include the fuel source 22, the air source 24 and the rotary kiln 10. As will be disclosed hereinafter, the operating conditions in the kiln are such that the large solid waste is converted primarily to particulate primary aggregate, volatile gases and gaseous combustion by-products with the amount of clinker produced by the rotary kiln being minimal. Operation of the rotary kiln 10 passes the solids to the exit portion 14 of the rotary kiln through the cooling chambers 18 to the exit chute 20. As here embodied, the solid material exiting the exit chute 20 is sent to kiln classifier 34. Classifier 34 may be any conventional mechanism for separating large solid particles from fine solid particles. As here embodied, any bolid material having a diameter in excess of ⅜ inches is classified as clinker or scrap metal with anything less than that being primary aggregate. The clinker and particulate is passed over a magnetic separator (not shown). The primary aggregate is passed over another magnetic separator (not shown). The ferrous metals are removed and sent to a metal bin for sale as scrap steel.

In accordance with the invention, there is provided means for inducing combustion in the oxidizer means to convert the waste fines, the volatile gases and the gaseous combustion by-products into noncombustible fines, molten slag and waste gas. As here embodied, the means for inducing combustion in the oxidizer means comprise the oxidizer fuel source 36 and oxygen source 38. Thus, the oxidizer 26 receives waste fines and volatile gases from the rotary kiln 10 which may or may not be combustible, combustion by-products from rotary kiln 10, fuel from fuel source 36 and oxygen from oxygen source 38. In the present embodiment, first oxidizer 26 operates at a temperature in the range of from 1800° F. to 3000° F. In an oxidizing environment, combustible materials within the first oxidizer 26 are converted to waste gas and noncombustible fines. The noncombustible fines may or may not be melted depending on their composition.

Figure 2:
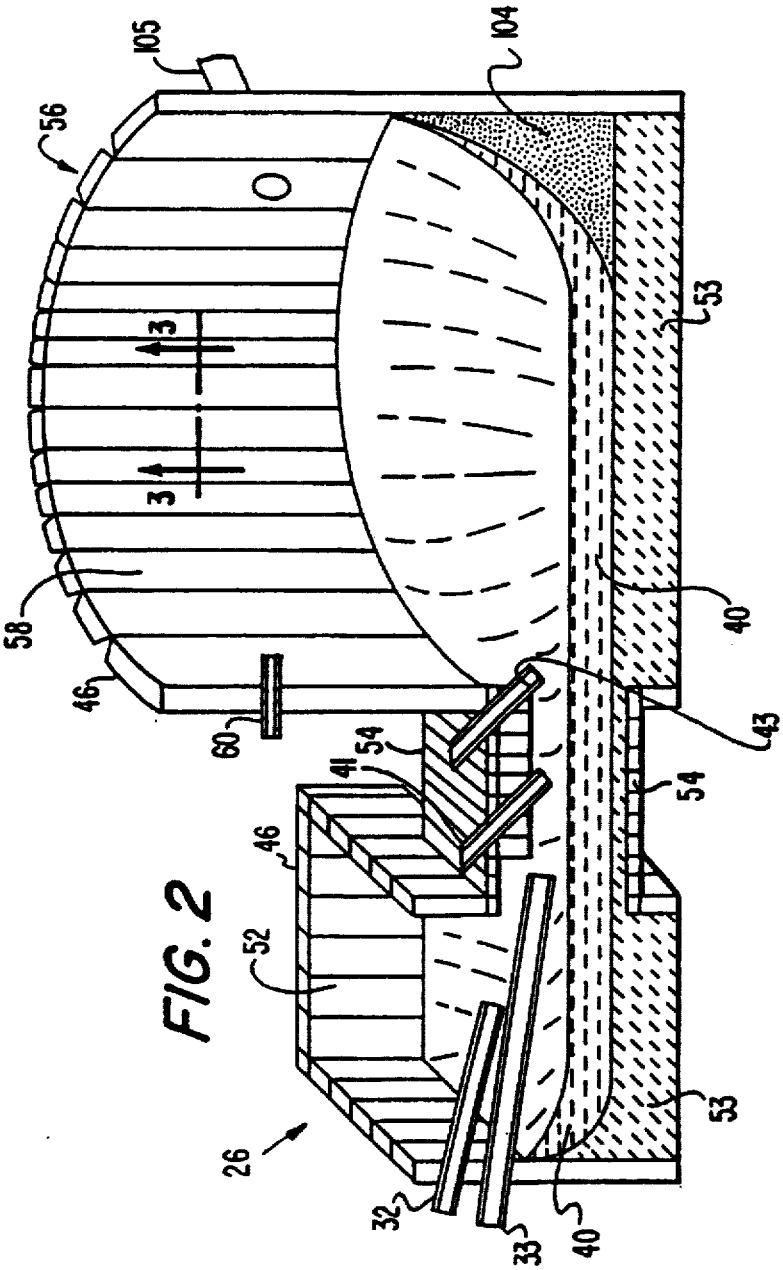
FIG. 2 is a partial cross-section of a portion of the oxidizing means of the embodiment of FIG. 1.

As shown schematically in FIG. 2, a portion of the noncombustible fines are melted and collect at the bottom of first oxidizer 26 in the form of liquid slag 40. The apparatus may optionally include burners directed into first oxidizer 26 for the purpose of raising the temperature at various locations within the oxidizer 26. As here embodied and depicted in FIG. 2, the first oxidizer 26 includes fuel-oxygen lances 32 and 33. In this embodiment, fuel-oxygen lance 33 has a 20 million BTU/hour capacity and is directed to the surface of the slag within the conduit 54 in such a manner to slightly impede slag flow from the second oxidizer 56 to the first oxidizer. Similarly, fuel-oxygen lances 41 and 43 are directed to the surface of the slag 40 and the flame slightly impedes flow of slag from oxidizer 56 to oxidizer 26. Fuel-oxygen lance 32 has a 90 million BTU/hour capacity and is directed to the slag 40 in the central portion of oxidizer 26.

Figure 3:
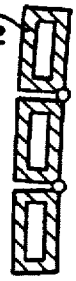
FIG. 3 is a cross-section of the water-cooled vessel wall of the two oxidizers depicted in FIG. 2.

As depicted schematically in FIG. 2, first oxidizer is a water-cooled, metal-wallet vessel in flow communication with the entry portion 12 of the rotary kiln 10. The first oxidizer in the present embodiment has a square cross section and includes vertical metal walls comprised of vertically oriented tubular metal coolant conduits 46. As depicted in FIG. 3, in this embodiment the conduits 46 are rectangular in cross section and welded along their length to form panels. In such an embodiment the walls 50 of the first oxidizer 26 are comprised of panels that are, in turn, comprised of the assembly of conduits 46 as shown in FIG. 3. In this embodiment 4 by 8 inch rectangular A500B steel tubing, having a 0.5 inch wall thickness, was used as the conduit. The construction depicted in FIG. 3 is a standard boiler construction and one skilled in the art of boiler construction can readily fabricate a cylindrical or flat panel from which to construct a flat sided or cylindrical oxidizer.

A coolant supply system (not shown) supplies coolant to the conduits 46 of the first oxidizer 26. The coolant flows through a conventional header system into the conduits 46 at the lower portion of the oxidizer and flows upward through the conduits. The temperature and flow rate of the coolant affect the temperature of the walls of the oxidizer 26 and may be used as process variables to control oxidation within the apparatus. There are, however, constraints on the coolant flow because it affects the temperature of the oxidizer walls. If coolant flow is such that the wall temperature is too low, then the process is not thermally efficient and fuel consumption is excessive. In addition, under certain conditions material within the oxidizer may deposit on the inner walls of the oxidizer and such materials may induce corrosion of the metal oxidizer walls. By contrast, if the coolant flow is such that the interior of the oxidizer walls operate at too high a temperature, the metal walls may be oxidized with a resulting loss in wall strength. Excessive wall temperature may also adversely affect the strength of the walls by affecting mechanical, thermomechanical or thermal treatments given the metal comprising the conduits 46. Where water is used as the coolant, the coolant temperature should be kept in the range of from 100° F. to 250° F.

Preferably, the coolant flow through the first oxidizer 26 keeps the interior wall surface at a temperature of less than about 600° F. and preferably about 300° F. Surprisingly, the walls at such a low temperature do not adversely affect process economics or the effectiveness of the oxidation process.

The first oxidizer 26 may include refractory brick 53 at the bottom due to the operating temperatures at that portion of the oxidizer caused by the flowing liquid slag 40 transmitting heat from the hot gases passing through the interior portion 52 of the oxidizer 26. Alternatively the slag may be allowed to accumulate and solidify to form a solid shell 53 supporting the molten slag much like the solid "skull" in skull melting operations. In the embodiment of FIG. 2, the hot gases are turned 90 degrees toward conduit 54 connecting the first oxidizer 26 with a second oxidizer 56. The construction of the second oxidizer 56 is similar in some respects to that of the first oxidizer 26. In the embodiment shown, however, the second oxidizer 56 is cylindrical with an interior 58 that is also cylindrical.

The hot gases and particulate fines pass from the first oxidizer 26 through the conduit 54 to the second oxidizer 56. The construction of the conduit 54 and the second oxidizer 26 is similar to that of the depicted embodiment of the first oxidizer in that they are water-cooled, metal-walled vessels.

Similar to first oxidizer 26, the second oxidizer 56 may also include refractory at the bottom portion thereof or the slag may be allowed to solidify to form a solid layer 53 as was previously disclosed with respect to oxidizer 26. The function of this layer has been discussed above. Similarly, the walls of the second oxidizer 56 are cooled by flow of coolant from a source (not shown) into the lower portion of the oxidizer 56. Oxidizer 56 receives preheated coolant that has been used to cool cross-over 72. The coolant flows upward within the conduits 46 and the walls of the second oxidizer are preferably kept in the range of from 300° F. to 600° F. The problems resulting from operating the apparatus with an inner wall temperature above or below the preferred range are the same as described previously in connection with oxidizer 26.

In the embodiment depicted, not all of the combustion of waste materials occurs in first oxidizer 26. A significant portion also occurs in second oxidizer 56. Thus, the operation of the embodiment of FIG. 1 noncombustible waste fines pass from the interior portion 52 of first oxidizer 26 through the conduit 54 into the interior portion 58 of the second oxidizer 56. In the preferred embodiment, the conduit 54 is generally rectangular and is comprised of water cooled upper walls and a refractory or slag lines lower portion. The upper walls are cooled in this embodiment by coolant that is the coolant output from the first oxidizer 26. The upper walls of the conduit 54 are preferably kept in the range of from 300° F. to 600° F. for the reasons set out above with respect to the first and second oxidizers.

In a preferred embodiment liquids are injected into second oxidizer 56 as here embodied through liquid inlet 60. The source of liquid for liquid inlet 60 in the present embodiment comprises a sump system (not shown) surrounding the entire apparatus. Any liquid, including waste derived fuels, rain water or contaminated rain water are collected in a sump system and injected into the second oxidizer 56 through liquid inlet 60. Thus, the overall apparatus has means for using waste derived fuel and contaminated water surrounding the apparatus within the apparatus itself. One skilled in the art to which the invention pertains can readily design a drainage and sump system to be operable with the present invention without specific disclosure of such a system.

Figure 4:
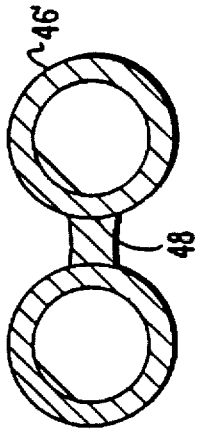
FIG. 4 is a cross-section of an alternate construction for a water-cooled vessel wall.

In accordance with the invention, there is provided a means for cooling the noncombustible fines and waste gas. As here embodied and depicted schematically in FIG. 1, there is included third oxidizer 62. The third oxidizer may be water cooled by passing coolant through the plurality of conduits that make up the walls of the vessel. Such an embodiment is depicted in FIG. 4 where conduits 46' are separated along their length and are welded to elongated metal spacers 48 that are located between the conduits 46'. In this embodiment the tubing has an outside diameter of 3.0 inches and a wall thickness of 0.3 inches.

Third oxidizer 62 includes a water inlet 64 for introducing water to the exterior of the vessel. In the present embodiment the water inlet 64 has therein a nozzle (not shown) that introduces water and air at greater than sonic velocities. In the present embodiment, the spray nozzle is a "sonic" model SC CNR-03-F-02 made by Sonic of New Jersey. In flow communication with the water inlet is a source of water 66. In the present embodiment the water source 66 is fed water that does not include waste. It is the function of the water from the water source 66 to cool the waste gas and noncombustible fines down to a temperature between about 350° F. to 400° F., such that the gas and particulate material can be separated by conventional separation means to be hereinafter disclosed. Optionally, the cooling means can be placed in another vessel (here vessel 65) downstream from oxidizer 62. In such an embodiment the material coming into oxidizer 62 is at a temperature of about 1600° F. and leaves at a temperature of about 1400° F. In this embodiment the input to the filtering means, here manifold 70 and filters 74, is at a temperature of about 400° F. or less.

In accordance with the invention, the apparatus includes means for passing the gaseous combustion by-products from the kiln and the water gas through the oxidizer means. As here embodied, there is included a cross-over 72 in flow communication between the second oxidizer 56 and the third oxidizer 62. In the preferred embodiment where the second and third oxidizers are vertically oriented cylindrical vessels, the cross-over 72 is a U-shaped vessel connecting the top openings of the second and third oxidizers. In such a configuration the air flow past the spray nozzles 65 is generally parallel to the spray from the nozzles and the particulates are efficiently cooled with a minimum of agglomeration. The cross-over 72 has a construction similar to that of the third oxidizer 62, namely, it is a metal-walled, water-cooled vessel constructed of tubes and spacers as depicted in FIG. 4. In the present embodiment, the cross-over 72 receives cooling water preheated by the passage through oxidizer 26 and conduit 54.

Operation of the preferred embodiment has determined that water cooling of the third oxidizer 62 is not necessary. The embodiment depicted includes as optional fourth oxidizer 65. This increases the residence time of the material within the oxidizer means and further assists in the elimination of hazardous components within the material being processed.

In this embodiment, oxidizers 62 and 65 are connected at their lower extremities by connector 73. Preferably, the apparatus includes means for removing solid particulate material form the bottom of the oxidizers. As here embodied and depicted schematically in FIG. 1, there is provided a drag conveyor 75 for extracting solid particulate material that would otherwise accumulate at the bottom of oxidizers 62 and 65 as well as within the connector 73 between these two oxidizers. The solid particulate material so collected is introduced to the conduit 75 leading to the accumulator 84 for reintroduction to oxidizer 56.

As here embodied and depicted in FIG. 1 schematically, there is a source of caustic material 67 which is in flow communication with the fourth oxidizer 65. It is the function of the caustic material to neutralize acid with the waste gas. The caustic material may be injected as a liquid or as a dry particulate such as hydrated lime through the pH control inlet 70. It is the function of the spray injection of caustic material to neutralize any acid within the waste gas. Optionally, caustic can be introduced into the third oxidizer 62.

In making connections between the various elements of the present invention, the effect of differential thermal expansion must be considered because of the high temperatures of the materials within the oxidizers 26 and 56, conduit 54 and cross-over 72. In addition, significant temperature differentials in different portions of the apparatus exist so that accommodation at the interface between such portions must be made for expansion and contraction.

As will be hereinafter disclosed, the system is run at less than an atmospheric pressure. Thus, any leakage at the interface between portions of the apparatus is not detrimental to the performance of the apparatus so long as the amount of leakage is not so excessive to detrimentally effect the combustion of materials within the oxidizers. This requirement is not as critical in other portions of the device operating at lower temperatures.

Figure 5:
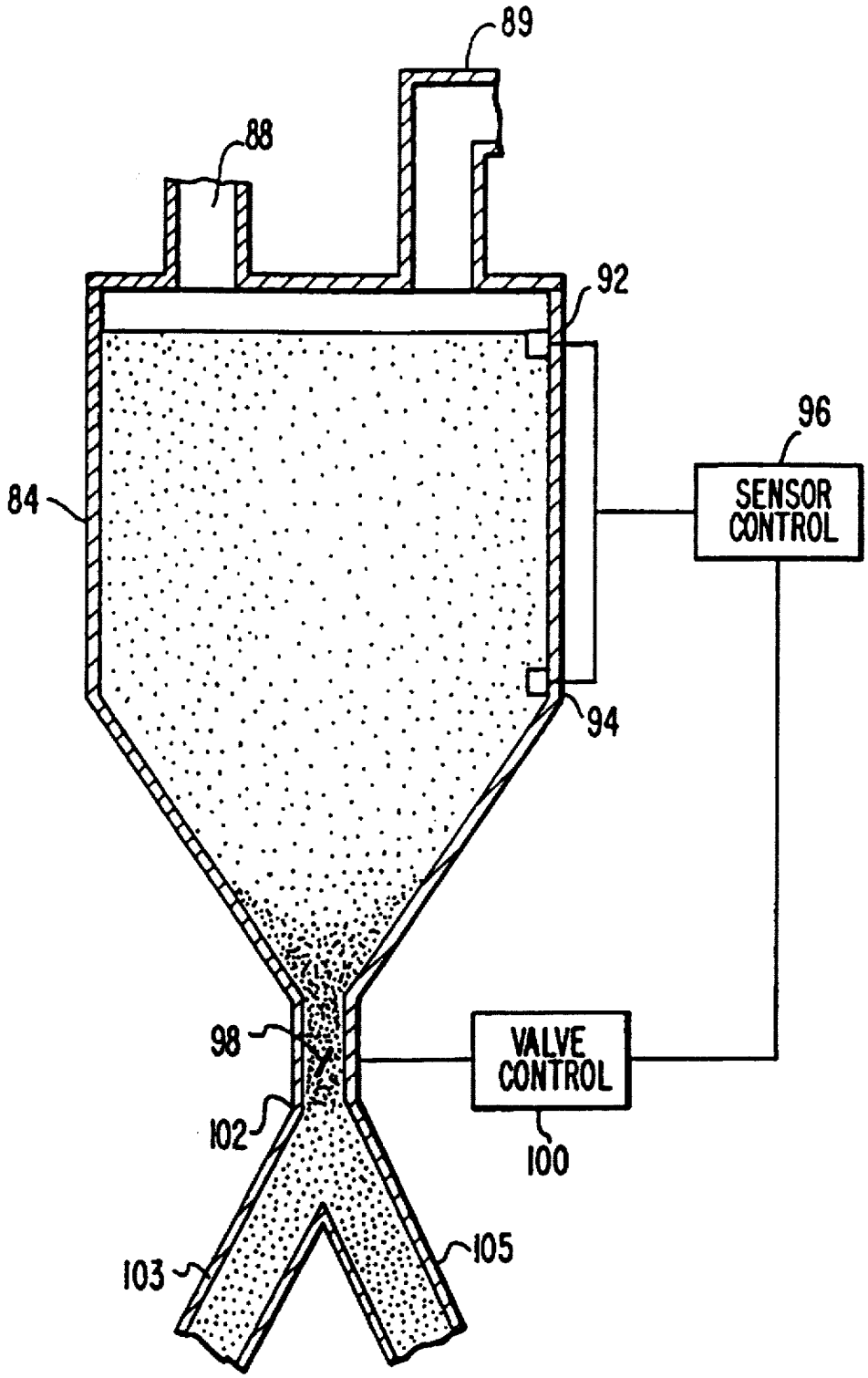
FIG. 5 is a schematic representation of an embodiment for accumulating particulate material that is introduced into the oxidizing means of the embodiments of FIGS. 1 and 2.

In accordance with the invention, the apparatus includes means for separating the noncombustible fines and the waste gas. As here embodied and depicted schematically in FIG. 1, the apparatus includes three filters 74 operating in parallel driven by two fans 76. The waste gas and particulate fines are introduced to the filters at a temperature preferably more than 350° F. and less that 400° F. so that conventional baghouse filters may be used. Operation of the present embodiment has determined that conventional teflon filter elements can be used in connection with this operation. The waste gas is separated from the noncombustible particulate fines and the waste gas is then passed by monitoring means 78 that monitor the composition and temperature of the waste gas. The waste gas is then passed into the atmosphere through stack 80. The fans 76 induce a draft throughout the entire apparatus drawing the volatile gases and combustion by-products from the rotary kiln. The combustion by-products from the rotary kiln, the combustion by-products from the oxidizers and all the gases passing through the system pass through the fans 76 such that the entire apparatus runs at sub-atmospheric pressure. The particulate fines accumulated in the filters 74 are passed by means of a pump means 82 through conduit 75 to the accumulator 84. Similarly, the primary aggregate is passed through conduit 85 by means of pump 86 into the accumulator 84. The preferred embodiment of the accumulator 84 is depicted in FIG. 5.

In accordance with the invention, there is provided means for introducing the solid particulate primary aggregate and reintroducing the noncombustible fines to the apparatus to form a substantially molten mixture. As here embodied and depicted in FIGS. 1, 2 and 6, the apparatus includes means of introducing the noncombustible particulate fines and the primary aggregate into the oxidizer means, in this embodiment, the second oxidizer 56. As depicted in FIG. 5, the accumulator 84 includes an inlet 88 disposed to receive particulate fines from conduits 75 and 85. This embodiment includes a vent 89 leading to a filter (not shown).

Figure 6:
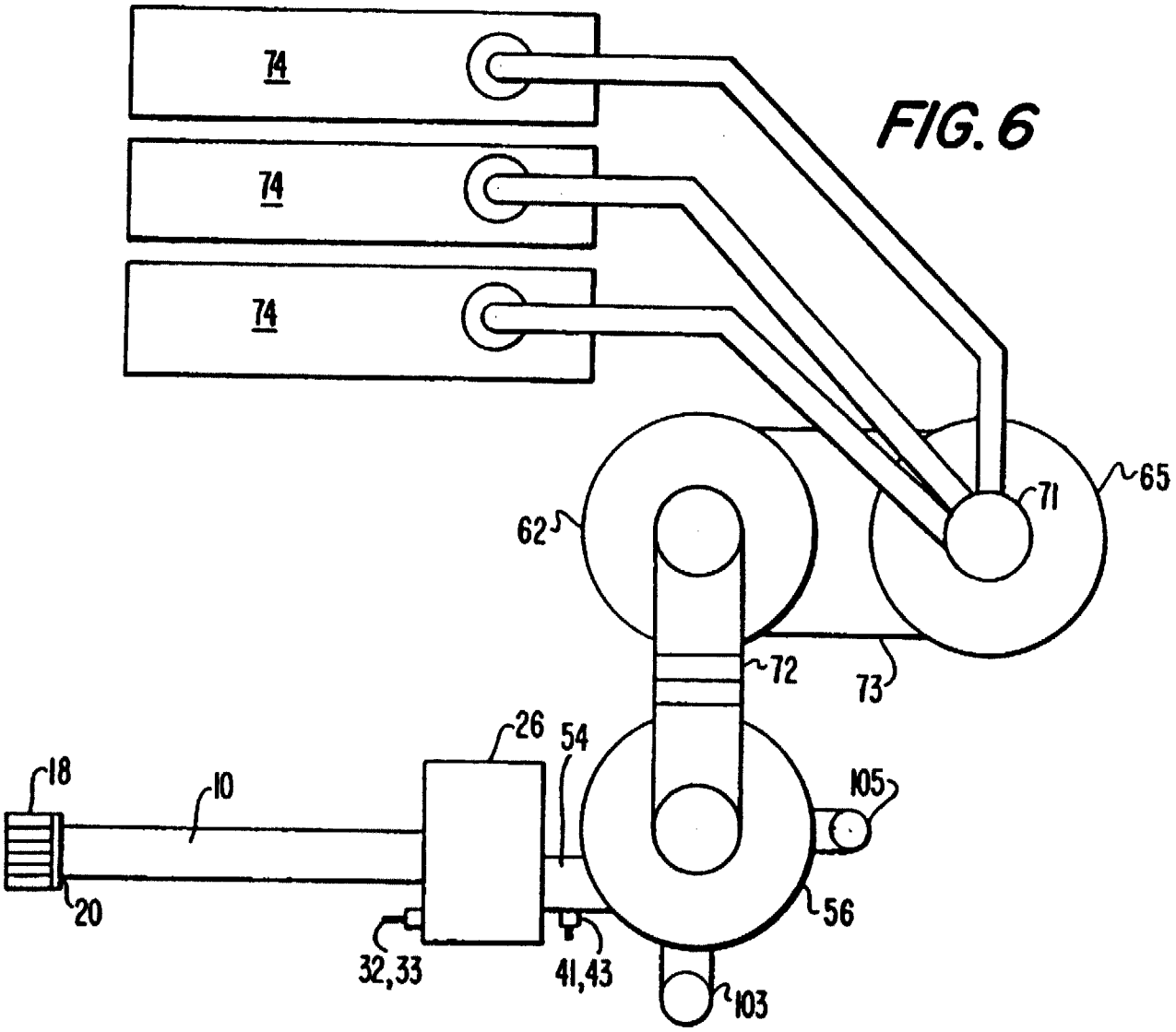
FIG. 6 is a schematic plan view of the embodiment of FIG. 1.

Associated with the preferred embodiment of the accumulator 84 is a first sensor 92 for detecting the desired maximum level of particulate material within the accumulator 84. A second sensor 94 detects the level of particulate material within the accumulator 84 and by means of a sensor control mechanism operates a valve 98 by means of valve control means 100. During operation of the apparatus, the inlet 88 introduces particulate material into the accumulator 84 where it accumulates up to a predetermined level such that upper sensor 92 is activated, it through control sensor control means 96 and valve control 100 opens the valve 98, thereby allowing particulate material to pass through the conduit 102 which is split into two inlet tubes 103 and 105 to introduce the particulate material into the second oxidizer 56 as depicted in FIGS. 2 and 6. When the level of particulate material within the accumulator 84 reaches the level of lower sensor 94, the sensor control and the valve control 100 close the valve 98, thereby interrupting flow of particulate material through the conduit 102.

While tubes 103 and 105 are shown introducing solid particulate material into the second oxidizer 56, solid particulate material may also be introduced into first oxidizer 26 or both the first and second oxidizers. As shown in FIG. 2, the solid particulate material introduced to the second oxidizer through tubes 103 and 105 (only tube 105 is depicted) falls onto the bottom of the second oxidizer 56 and forms a pile 104. Heat from the gas passing through the second oxidizer 56 is impinged on the surface of the pile of particulate material melting the portion of the particulate material that has a melting point below that of the gas being impinged on the surface. The material flows from the pile 104 entraining any particulate material that is not melted therein and joins the molten slag 40 at the bottom of oxidizer 56. As depicted in FIG. 2, the liquid slag 40 accumulates on the bottom of oxidizer 26, the conduit 54 and the oxidizer 56. While the molten slag may be extracted from the conduit 54, it is preferred to remove the molten slag 40 from the apparatus by means of a separate slag box.

Figure 7:
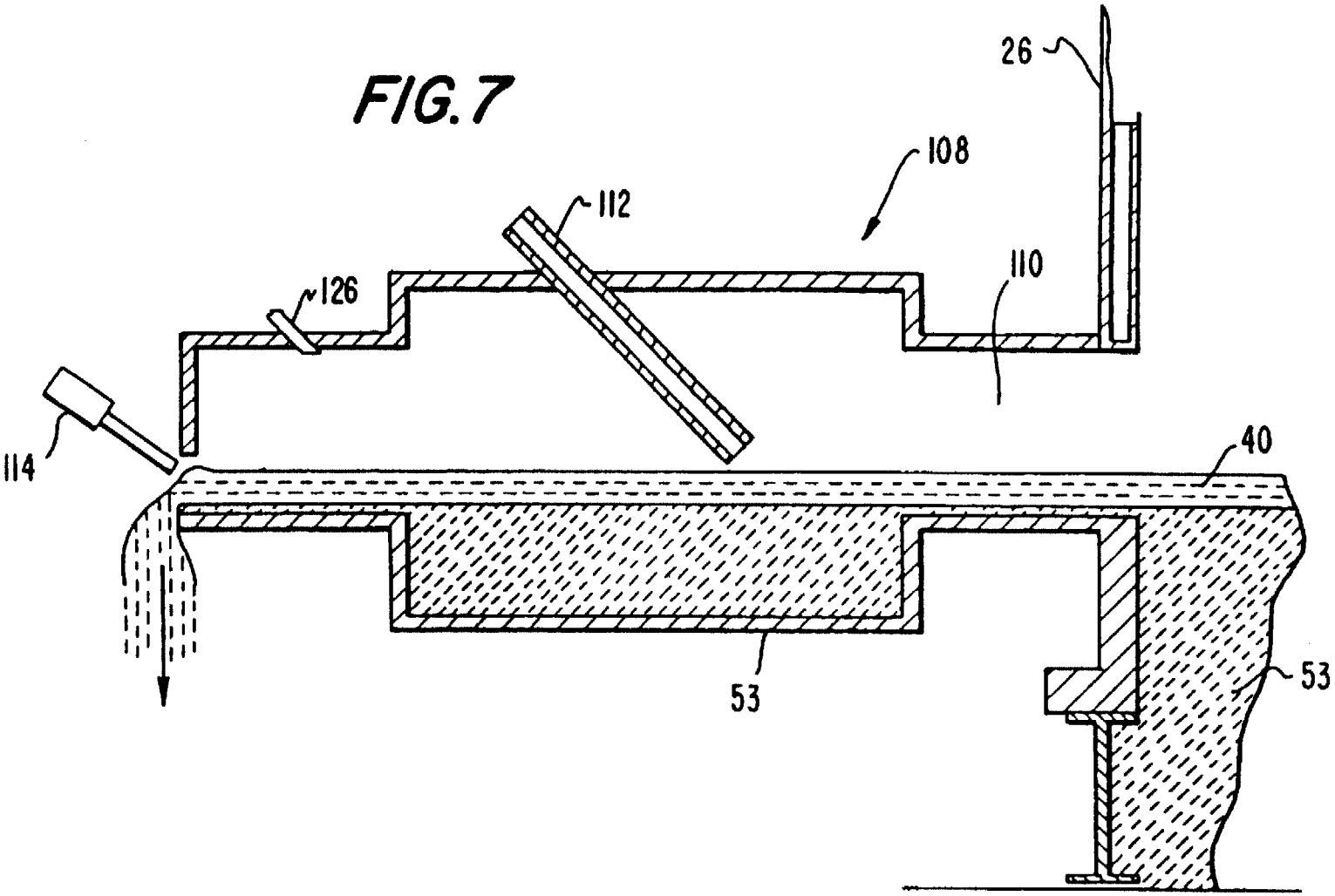
FIG. 7 is a schematic cross-sectional view of a preferred means for removing slag from the depicted embodiment.

As depicted in FIG. 7, the slag box 108 is generally rectangular in cross-section with an opening 110 in flow communication with the bottom of the oxidizer 26. Molten slag 40 flows into the slag box 108 where it is exposed to jets of flame from burner 112. The jet from burner 112 is sufficiently energetic to create turbulence in the molten material 40 within the slag box 108 and thus assist in the vitrification of material therein. Burner 112, in combination with the burners 32, 33, 41, and 43 depicted in FIG. 2 are directed to slightly impede flow of molten slag from exit port 124 and thus increase the residence time within the apparatus. This preferred embodiment further includes a burner 114 at the exit port 124 to provide additional control of the slag temperature just prior to it being quenched. Conditions in the slag box 108 are monitored by an optical pyrometer throat port 126.

In this embodiment, the slag box 108 is constructed of water-cooled metal walls with the lower portion that contacts the molten slag being either refractory lined or including a solid layer of solidified slag.

In accordance with the invention, the apparatus includes means for cooling the substantially molten mixture to form the non-hazardous aggregate. As here embodied, the device includes cooling means 106 depicted schematically in FIG. 1. In the preferred embodiment the cooling means simply comprise water into which the substantially molten mixture is dumped. The cooling means extract the heat from the molten mixture and form the non-hazardous aggregate.

Operation of the previously described apparatus will now be described in terms of a process for using hazardous waste in a manufacturing process to form a non-hazardous aggregate. The first step of the process is providing a source of solid waste material that is comprised of large solid waste and waste fines. In the embodiment of the present invention, the waste is transported to the apparatus in various forms. The waste can be in the form of a particulate solid such as contaminated top soil, contaminated construction rubble, semi-solid sludge from a sewage treatment operation, metal drums of liquid waste, fiber drums (commonly referred to as lab packs) containing liquids or solids. When the waste material is a liquid bearing sludge, the waste is first passed over a shaker screen where the liquid is removed and introduced into the apparatus of the present invention separately from the solid residue. Where the waste is contained in 55 gallon metal drums, the drums are shredded and introduced into the rotary kiln as part of the large solid waste, thereby eliminating the need for cleaning or inspection of the drums. It may also be necessary to shred the input materials several times to obtain an input material that is efficiently consumed in the process.

In controlling the process and the operating temperatures of the various components carrying out the process, it is advantageous to know the certain characteristics of the input materials so that the feed rate of the waste materials and other input materials introduced to the apparatus can be controlled to obtain the desired operating conditions. Preferably, the waste material arrives with a description that would include a BTU and moisture content. It may also be necessary, however, to check the BTU content and other characteristics of the input materials so that the operation of the apparatus can be facilitated. It should be noted that while a load of waste material may have an overall BTU content of one value, many times the waste is non-homogenous and therefore the operation of the apparatus and the control of the process requires some intervention to prevent the operating parameters from deviating from that necessary to completely oxidize the combustible components of the waste and produce the desired non-hazardous aggregates. In addition to the BTU and moisture content, it is advantageous to also know the acid content, the amount of ash and the halogen concentration. The acid content of the water provides the operator with means to assess how much caustic would be consumed in the process which impacts both the operation of the process and its economics. The amount of ash in the waste determines how much aggregate will be produced. The halogen content affects the operations of the process and preferably should be in the range of from 1 to 5%. Using these characteristics of the waste and by appropriately controlling the input of water, auxiliary fuel, oxygen, caustic, coolant and the like, to achieve the desired operating conditions the desired aggregate can be economically produced.

The process further includes the step of separating the large solid waste from the fines, as disclosed above, the separation may occur in the rotary kiln 10 or may be accomplished by simply directing the appropriately sized waste to different positions of the apparatus. For example, if the waste fines are contaminated top soil, they can be directly introduced to the oxidizing means.

The large solid waste is introduced to a rotary kiln having an input portion, a combustion portion and an exit portion. The operating conditions in the kiln are controlled such that the large solid waste is combusted to form solid particulate primary aggregate, clinker and gaseous combustion by-products with a major portion of volatile combustibles in the large solid waste being volatilized in the input portion of the kiln. Preferably, the rotary kiln is operated at an average internal temperature in the range of from about 1600° to 2300° F.

It should be noted that there are considerable temperature gradients within the kiln, both along its length and in the radial direction. Therefore, portions of the kiln may deviate significantly from the range of from 1600° F. to 2300° F.

The large solid waste is introduced into the rotary kiln at a rate depending on its BTU content but normally at a rate of approximately 20 tons per hour. The kiln is rotated at a speed in the range of from 1 to 75 RPH such that the total residence time of solid material exiting the kiln at the exit portion 14 is in the range of from about 90 to 120 minutes.

At these operating parameters the rotary kiln produces a solid output consisting predominantly of solid particulate primary aggregate with a minor amount of material that can be classified as clinkers. For purposes of the present invention, clinkers are normally large sized solids, of example, construction bricks that pass through the rotary kiln unreacted or agglomerations of low melting point material that have melted and agglomerated at the relatively low temperatures in the rotary kiln. The operating conditions of the rotary kiln are controlled to facilitate two conditions.

First, to convert the major portion of the large solid waste into solid particulate primary aggregate and second, to volatilize a major portion of the volatile combustibles in the large solid waste in the input portion of the rotary kiln. As will be discussed hereinafter, the primary aggregate is recirculated into the process to be melted and introduced to the molten slag in the oxidizing means. Inasmuch as the slag is formed into the non-hazardous aggregate, it is desired to convert as much of the processed materials into that form as possible. The material forming the clinker output from the kiln is tested to determine if it has hazardous material that can be leached therefrom. Any material having leachable hazardous material is reintroduced into the rotary kiln at the input portion. Operation of the present apparatus and process results in a very minor portion of the output from the rotary kiln being classified as clinker material.

The second goal in operating the rotary kiln is to volatilize a major portion of the volatile combustibles in the input portion of the rotary kiln. This reduces the BTU content of the solid material passing through the rotary kiln into the combustion portion 16 of the rotary kiln. If the BTU content of the solid portion reaching the combustion portion 16 of the rotary kiln 10 is excessive, uncontrolled combustion can occur within the combustion portion of the kiln. Thus, the operating conditions of the rotary kiln should include a temperature at the input portion high enough to volatilize most of the volatile components in the large solid waste being introduced to the kiln.

As depicted schematically in FIG. 1, the solid material exiting the exit chute 20 is sent to kiln classifier 34. Classifier 34 may be any conventional mechanism for separating large solid particles from fine solid particles. As here embodied, any solid material having a diameter in excess of ⅜ inches is classified as clinker with anything less than that being primary aggregate. The clinker and particulate is passed over magnetic separators (not shown) and the ferrous metals are removed and sent to a metal bin for sale as scrap steel.

The gaseous combustion by-products from the kiln are passed therefrom by means of an induced draft. As disclosed above, the fans 76 maintains the entire apparatus at a subatmospheric pressure and draw the gas from the rotary kiln as well as the oxidizer through the entire system.

The process includes introducing waste fines to oxidizing means. As here embodied, waste fines form rotary kiln 10 are entrained in the gas stream and carried into the oxidizer 26. Combustible material is introduced into the oxidizing means. As here embodied, there is a source of liquid fuel 36 associated with the first oxidizer 26. The input of fuel, waste fines, volatile gases from the solid waste material in the kiln and oxygen injection are all used to control the temperature in the first oxidizer which should range from about 1800° to 3000° F. The temperature is determined by the air flow and BTU content of the input materials, including any auxiliary fuel that is introduced. Preferably, the auxiliary fuel from the fuel source 36 comprises combustible liquid waste material. It is further preferred that the combustible liquid waste material comprise a liquid which is either organic solvents, liquid drilling waste or paint.

The process includes the step of inducing combustion in the oxidizing means to convert the waste fine to noncombustible fines, molten slag and waste gas. As here embodied, the oxidizing mean is comprised of three oxidizers, the first oxidizer 26, second oxidizer 56 and third oxidizer 62. In the first oxidizer 26, a major portion of the combustible material is oxidized to form gaseous combustion by-products. These are drawn through the interior 52 of the first oxidizer 26 through the conduit 54 into the interior 58 of the second oxidizer 56. At the temperature of operation, 1800° to 3000° being preferred, some of the solid material is melted. This material collects at the bottom portion of the first oxidizer, as shown in FIG. 2 as the liquid slag 40, which then runs toward the box 108. The unmelted solid particulate material passes with the gaseous combustion by-products through the conduit 54 into the interior of oxidizer 56 where a portion may be melted in the second oxidizer 56 or it may remain unmelted and pass through the device as solid particulate fines.

Solid particulate primary aggregate and noncombustible fines are introduced into the oxidizing means. As here embodied and clearly depicted in FIGS. 2 and 6, tubes 103 and 105 introduce the primary aggregate and solid particulate fines to the interior of the second oxidizer 56. Preferably, the primary aggregate and solid particulate fines are introduced in discrete batch portions. Continuous introduction of these materials into the oxidizer cools the surface of the pile of particulate material within the oxidizer preventing melting of the surface. This inhibits the melting of the particulate material being introduced to the oxidizer and thereby inhibits the production of the molten slag that forms the non-hazardous aggregate.

As depicted schematically in FIG. 2, it is preferred that the discrete batch portions of primary aggregate and noncombustible fines be introduced to the second oxidizer to form a pile in the oxidizer. Heat from the oxidizing means is impinged on the surface of the pile whereupon material having relatively low melting points is melted to run down to the bottom of the oxidizer toward the conduit 54 where the molten material flows to the first oxidizer 26 and exits the slag box 108. The process may generate either aggregate of noncombustible particulate fines that have a melting point higher than the temperature of the second oxidizer. Thus, such particulate material would not be melted. It is, however, entrained within the molten material formed in the second oxidizer and into the slag to form a substantially molten mixture. By melting the surface of the pile and allowing the molten material and the solid particulate material entrained therein to run toward the conduit 54, this exposes a new surface on the particulate material that is then melted to run out of the apparatus through the slag port. While the embodiment shown herein illustrate the introduction of the primary aggregate and noncombustible particulate fines to the second oxidizer, the process is also operable if a portion of that material is introduced to the first oxidizer. It is also possible to separately inject the primary aggregate into either oxidizer or the particulate fines into either oxidizer, however, it is preferred to combine the particulate primary aggregate and noncombustible particulate fines and reintroduce them into the process as a combination.

The embodiment of FIG. 2 also shows an apparatus for injecting oxygen into the first oxidizer. The process is also operable with injection of oxygen into the second oxidizer, shown in FIG. 2 schematically as oxygen injector 60. During preferred operation of the device, the average temperature in the first oxidizer is approximately 3000° F. Temperature in the conduit between the first and second oxidizer is about 2800° F. and temperature in the second oxidizer is approximately 2800° F. It is also preferred that the second oxidizer be disposed to receive liquid in relatively small amounts such that any combustible hazardous waste within the liquid is oxidized within the oxidizer means. As here embodied, it is the second oxidizer 56 that includes a inlet 61. At the temperature of operation of the second oxidizer, the water is vaporized and the solids are introduced into the hot gas stream to be either combusted, melted or passed out with the other noncombustible particulate fines into the downstream section of the apparatus.

It is further preferred that the waste gas, the gaseous combustion by-products and noncombustible from the oxidizing means be cooled by an injection of water to form a cooled effluent. As here embodied and schematically depicted in FIG. 1, a third oxidizer 62 includes means for injecting water into the third oxidizer. Preferably, the water forms a cooled effluent having a temperature of less than about 400° F. and preferably more than 350° F. As previously disclosed, the cooling may also take place in oxidizer 65.

It is further preferred that any acids in the cooled effluent be neutralized. As here embodied and depicted schematically in FIG. 1, the apparatus includes means for introducing a caustic material to form a neutralized effluent comprised of noncombustible fines and waste gas. The process is operable with solid particulate caustic material or a caustic solution being added to the third or fourth oxidizer.

Preferably, the waste gas is separated from the noncombustible fines by dry filtration. This step can be accomplished by passing the noncombustible fines and waste gas through a conventional baghouse shown in FIGS. 1 and 6 as filter 74. The fans associated with the baghouse, in this embodiment, fans 76 in FIG. 1, induce a draft throughout the entire apparatus such that the apparatus is operated at a pressure below atmospheric pressure.

The primary advantage of using water cooled oxidizers is to reduce the amount of water needed to cool the material before filtration. The basic process of eliminating the hazardous materials is by oxidation. Thus, the process is, in some respects, limited by the throughput of oxygen in the system. Oxygen is drawn into the apparatus by the fans 76 and if excessive water is injected to cool the mixture before filtration, the fans 76 have to exhaust large amounts of steam. This, in turn limits the amount of oxygen that can be drawn into the system for oxidation. The preferred embodiment using the water cooled oxidizer significantly reduces the need for cooling water injection while maintaining the condition needed for effective oxidation of the hazardous materials.

The process includes a step of cooling the mixture of molten slag and solid particulates to form a non-hazardous aggregate. In the preferred embodiment the mixture of molten slag and solid particulates is introduced to a water filled conveyer where the quenching effect of the water cools the mixture to form the solid non-hazardous, non-leaching aggregate. The water used to cool the molten material is then reintroduced to the process either with waste water into the second oxidizer 56 or into the third oxidizer 62.

Operation of the present invention results in the production of four effluents: ferrous metal, which is passed through the rotary kiln and is thus free of hazardous material; clinker that is passed through the rotary kiln, which if it contains hazardous material is either bound into the structure of the clinker or is reintroduced to the process until the clinker composition is non-hazardous. The third effluent is the gaseous effluent from the stack 80 and consists primarily of carbon dioxide and water. While the preferred embodiment is not classified as a hazardous waste incinerator and is not subject to hazardous waste incineration requirements, its air quality permit is based on the same considerations applied to a Part "B" hazardous waste incinerator. The present invention readily meets such a criteria. In addition to meeting stringent air quality specifications, the aggregate produced from the process while containing heavy metals that would be hazardous if removable from the aggregate, has converted the material to a form where the heavy metals are bound into the glass-like aggregate. Specifically, the levels of arsenic, barium, cadmium, chromium, lead, mercury, selenium and silver are all well below the regulatory limit. In addition, the concentration of pesticide herbicide compounds, acid phenol compounds, base neutral compounds and other volatile compounds are well below the regulatory limits. Thus, although the input materials may contain hazardous materials, the materials are either oxidized by oxidation or locked within the structure of the aggregate such that the process produces no hazardous effluents.

The present invention has been disclosed in terms of a preferred embodiment. The invention, however, is not limited thereto. The scope of the invention is to be determined solely by the appended claims and their equivalents.

What is claimed is:

1. An apparatus for converting hazardous waste into non-hazardous, non-leaching aggregate, said apparatus comprising:

a rotary kiln having an entry portion;

oxidizing means adjacent the entry portion of said kiln, said oxidizing means comprising a water-cooled, metal-walled vessel;

a source of solid waste material, said solid waste material comprising large solid waste and waste fines;

means for separating said large solid waste from said waste fines;

means for introducing said large solid waste to said entry portion of said rotary kiln;

means for introducing said waste fines to said oxidizing means;

means for inducing combustion in said kiln to convert said large solid waste to solid particulate primary aggregate, clinker, volatile gases and gaseous combustion by-products;

means for separating said clinker from said solid particulate primary aggregate;

means for inducing combustion in said oxidizing means to convert said waste fines, said volatile gases and said gaseous combustion by-products into noncombustible fines, molten slag, and waste gas;

means for passing said gaseous combustion by-products from said kiln and said waste gas from said oxidizing means;

means for cooling said noncombustible fines and said waste gas;

means for separating said noncombustible fines and said waste gas;

means for introducing said solid particulate primary aggregate and said noncombustible fines, to said molten slag to form a substantially molten mixture;

means for removing said mixture from said apparatus; and means for cooling said substantially molten mixture to form said non-hazardous, non-leaching aggregate.

2. The apparatus of claim 1 wherein said oxidizing means comprise a plurality of vessels in flow communication with the entry portion of said rotary kiln, said oxidizing means including first and second oxidizers.

3. The apparatus of claim 2 wherein said oxidizing means includes a first oxidizer disposed to receive said waste fines, volatile gases and gaseous combustion by-products from said kiln.

4. The apparatus of claim 2 wherein said oxidizing means includes a second oxidizer disposed to receive said waste fines, volatile gases and gaseous combustion by-products from said first oxidizer.

5. The apparatus of claim 2 wherein said apparatus includes a slag removing vessel in flow communication with said first oxidizer.

6. The apparatus of claim 5 wherein said slag removing vessel includes means for removing said molten mixture from said oxidizing means.

7. The apparatus of claim 6 wherein said slag removing vessel includes a burner for heating material therein.

8. The apparatus of claim 2 wherein said oxidizing means includes a third oxidizer disposed to receive said waste fines, volatile gases and gaseous combustion by-products from said second oxidizer.

9. The apparatus of claim 8 including a cross-over means for connecting said second and third oxidizers.

10. The apparatus of claim 9 wherein said cross-over means comprises a water-cooled, metal-walled vessel connecting said second and third oxidizers.

11. The apparatus of claim 1 including means for introducing said noncombustible particulate fines and said primary aggregate into said oxidizing means.

12. The apparatus of claim 2 including means for introducing said noncombustible particulate fines and said primary aggregate into said second oxidizer.

13. The apparatus of claim 12 including means for removing said molten mixture form said first oxidizer.

14. The apparatus of claim 1 wherein said means for passing said gaseous combustion by-products from said kiln and said waste gas from said oxidizing means includes means for inducing sub-atmospheric pressure in said apparatus.

15. The apparatus of claim 1 wherein said means for separating said solid waste from said waste fines comprise said rotary kiln.

16. The apparatus of claim 1 wherein the major portion of the vertical walls of said oxidizing means are comprised of substantially vertically oriented tubular conduits.

17. The apparatus of claim 16 wherein the vertical walls of at least one of said oxidizers are comprised of a plurality of parallel metal conduits having a rectangular cross section.

18. An apparatus for converting hazardous waste into non-hazardous, non-leaching aggregate, said apparatus comprising:

a rotary kiln having an entry portion;

oxidizing means in flow communication with said kiln, said oxidizing means comprising at least one water-cooled, metal-walled vessel;

a source of solid waste material, said solid waste material comprising large solid waste and waste fines;

means for separating said large solid waste from said waste fines;

means for introducing said large solid waste to said entry portion of said rotary kiln;

means for introducing said waste fines to said oxidizing means;

means for inducing combustion in said kiln to convert said large solid waste to solid particulate primary aggregate, clinker, volatile gases and gaseous combustion by-products;

means for inducing combustion in said oxidizing means to convert said waste fines, said volatile gases and said gaseous combustion by-products into noncombustible fines, molten slag, and waste gas;

means for introducing said solid particulate primary aggregate and said noncombustible fines to said oxidizing means and to said molten slag to form a substantially molten mixture; and means for removing said mixture from said apparatus.

19. The apparatus of claim 18 wherein said oxidizing means comprise a plurality of vessels in flow communication with the entry portion of said rotary kiln.

20. The apparatus of claim 19 wherein said oxidizing means includes a first oxidizer disposed to receive said waste fines, volatile gases and gaseous combustion by products from said kiln.

21. The apparatus of claim 19 wherein said oxidizing means includes a second oxidizer disposed to receive said waste fines, volatile gases and gaseous combustion by-products from said first oxidizer.

22. The apparatus of claim 18 wherein the major portion of the vertical walls of said oxidizing means are comprised of substantially vertically oriented tubular conduits.

23. The apparatus of claim 18 wherein the vertical walls of at least one of said oxidizers are comprised of a plurality of parallel metal conduits, having a rectangular cross-section.

24. The apparatus of claim 19 wherein said oxidizing means includes a first oxidizer disposed to receive said waste fines, volatile gases and gaseous combustion by-products from said kiln and wherein said oxidizing means includes a second oxidizer disposed to receive said waste fines, volatile gases and gaseous combustion by-products from said first oxidizer.

25. The apparatus of claim 24 wherein said second and third oxidizers comprise two generally cylindrica,l vertically-oriented vessels, the upper ends of said vessels having openings therein.

26. The apparatus of claim 25 wherein said oxidizing means includes a cross-over connecting said second and third oxidizers, said cross-over being comprised of a generally U-shaped vessel connecting the top openings of said second and third oxidizers.

27. The apparatus of claim 26 wherein said cross-over comprises a metal-walled, water-cooled vessel.

28. An apparatus for converting hazardous waste into non-hazardous, non-leaching aggregate, said apparatus comprising:

a rotary kiln having an entry portion;

oxidizing means in flow communication with said kiln, said oxidizing means comprising at least one water-cooled, metal-walled vessel;

means for controlling the temperature within said oxidizing means;

a source of solid waste material, said solid waste material comprising large solid waste and waste fines;

means for separating said large solid waste from said waste fines;

means for introducing said large solid waste to said entry portion of said rotary kiln;

means for introducing said waste fines to said oxidizing means;

means for inducing combustion in said kiln to convert said large solid waste to solid particulate primary aggregate, clinker, volatile gases and gaseous combustion by-products;

means for inducing combustion in said oxidizing means to convert said waste fines, said volatile gases and said gaseous combustion by-products into noncombustible fines, molten slag, and waste gas;

means for introducing said solid particulate primary aggregate and said noncombustible fines to said oxidizing means and to said molten slag to form a substantially molten mixture;

means for removing said mixture from said apparatus; and means for cooling said substantially molten mixture to form said non-hazardous, non-leaching aggregate.

29. The apparatus of claim 28 wherein the temperature controlling means includes means for cooling the walls of said oxidizing means.

*30. An apparatus for converting hazardous waste into non-hazardous material, said apparatus comprising:*

*a source of solid waste material, said solid waste material comprising large solid waste and waste fines;*

*a separator for separating said large solid waste and said waste fines;*

*an oxidizer comprising at least one vessel;*

*a device for introducing said waste fines to said oxidizer;*

*a device for inducing combustion in said oxidizing means to convert said waste fines into noncombustible fines, molten slag, and waste gas;*

*at least one conduit for passing said waste gas and said non-combustible fines from said oxidizer;*

*a separator for separating said noncombustible fines and said waste gas;*

*a device for introducing said noncombustible fines into said molten slag in said oxidizer to form a substantially molten mixture;*

*at least one exit from said oxidizer for passing said substantially molten mixture from said oxidizer; and*

*a device for cooling said substantially molten mixture to form said non-hazardous material.*

*31. The apparatus of claim 30 wherein said oxidizer comprise first and second vessels.*

*32. The apparatus of claim 31 wherein said first vessel includes a mechanism for introducing said noncombustible fines into the slag in said first vessel.*

*33. The apparatus of claim 31 wherein said second vessel includes a mechanism for introducing said noncombustible fines into the slag in said second vessel.*

*34. The apparatus of claim 30 wherein said apparatus includes a slag receiving vessel in flow communication with said oxidizer.*

*35. The apparatus of claim 34 wherein said oxidizer comprise first and second vessels and said slag receiving vessel includes an exit for passing said substantially molten mixture from said oxidizer.*

*36. The apparatus of claim 35 wherein said slag receiving vessel includes a burner for heating material therein.*

*37. The apparatus of claim 31 wherein said oxidizer further comprise a third vessel disposed to receive said waste fines.*

*38. The apparatus of claim 30 wherein said apparatus includes a device for inducing sub-atmospheric pressure in said apparatus.*

*39. The apparatus of claim 30 wherein said apparatus further includes a rotary kiln for separating said large solid waste from said waste fines.*

*40. Apparatus for converting hazardous waste into non-hazardous waste, such apparatus comprising:*

*a vessel;*

*a source of solid waste material comprising;*
*large solid waste and,*
*waste fines*

*means for separating said large solid waste from said waste fines,*

*a device for introducing said waste fines into said vessel;*

*a device for introducing combustion into said vessel to convert said waste fines into;*
*non-combustible material;*
*molten slag and;*
*waste gas;*

*combustion means for converting said large solid waste into solid particulate primary aggregate;*

*a device for separating said non-combustible material, molten slag and waste gas;*

*a collector for collecting said molten slag;*

*means for introducing said non-combustible material into said molten slag and means for introducing said solid particulate primary aggregate into said molten slag to form a substantially molten mixture;*

*a device for passing said substantially molten mixture from said apparatus.*

* * * * *